Jan. 2, 1968     C. A. HERMAN     3,360,977
APPARATUS AND METHOD FOR TESTING FRICTION MATERIALS
Filed July 30, 1965
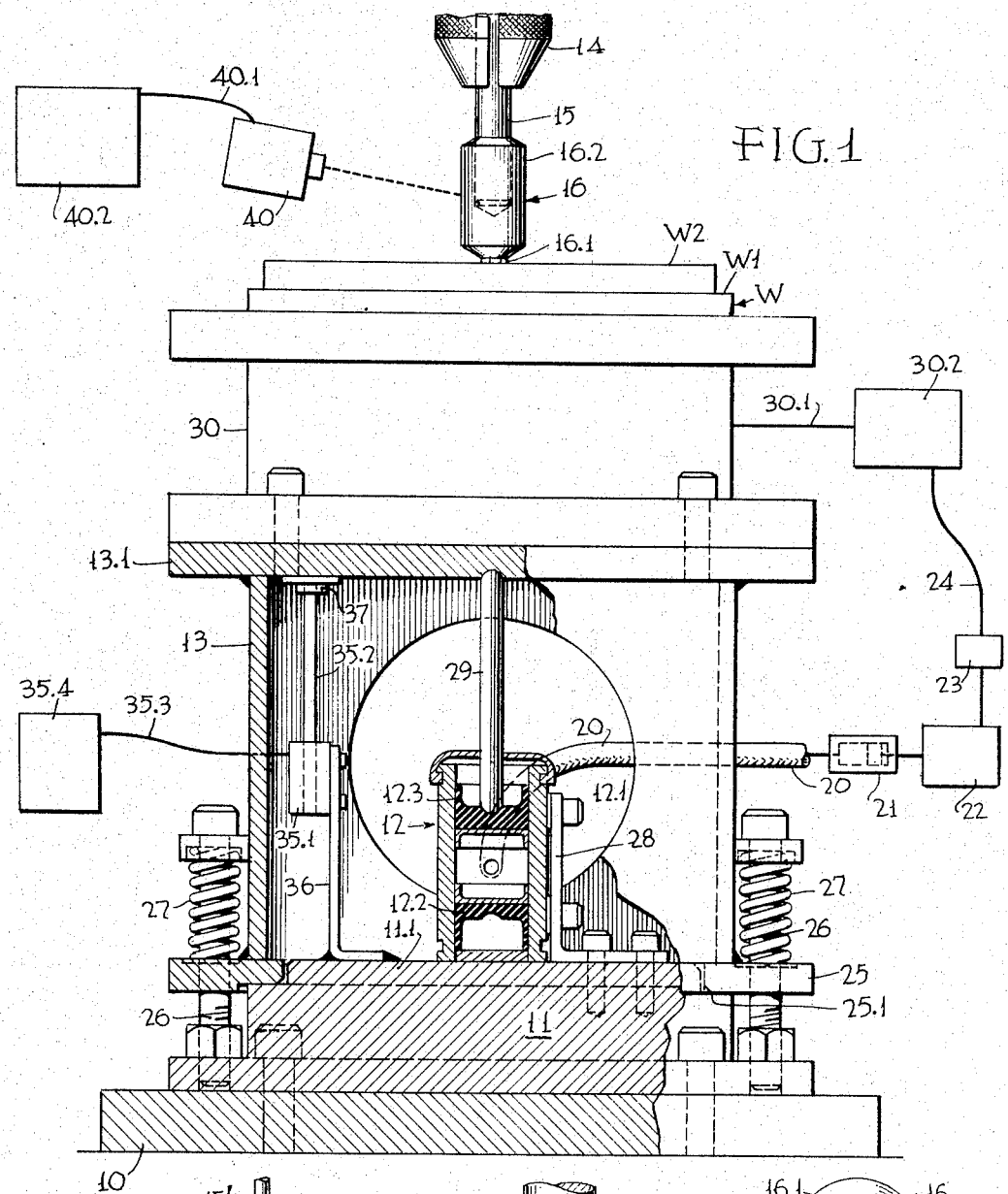
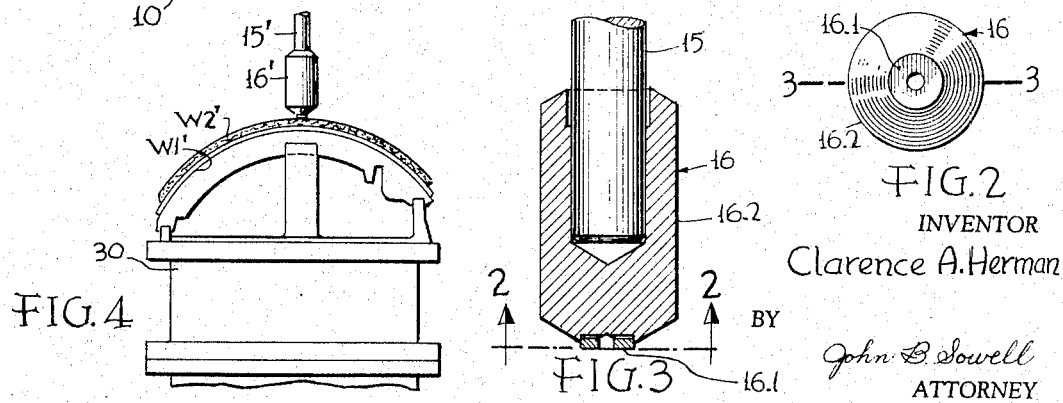
INVENTOR
Clarence A. Herman
BY
John B. Sowell
ATTORNEY United States Patent Office 3,360,977
Patented Jan. 2, 1968

3,360,977
APPARATUS AND METHOD FOR TESTING
FRICTION MATERIALS
Clarence A. Herman, Detroit, Mich., assignor to The
Budd Company, Philadelphia, Pa., a corporation of
Pennsylvania
Filed July 30, 1965, Ser. No. 475,972
11 Claims. (Cl. 73—9)

ABSTRACT OF THE DISCLOSURE

An apparatus for non-destructive testing of brake lining material by frictionally engaging a rotating disk under controlled condition with a portion of the brake lining material and recording the resultant temperature rise, thrust, torque and penetration of the lining material by the rotating disk for determining the acceptability of the lining material.

This invention relates to apparatus and method for testing friction materials, especially for making non-destructive tests on brake lining materials, and has for an object the provision of improvements in this art.

In producing brakes it has been found that brake lining materials supplied for use on the brakes have wide and erratic variation in quality as to different lots and even as to different portions of the same lot.

The present usual practice is to take lined brake shoes off the production line from time to time and test them in a complete brake assembly on a full-scale test machine which is arranged to simulate the conditions of actual service on an automobile. This, to be meaningful, is necessarily a destructive test and, since a considerable number of units must be tested because of the variations in quality, the total cost of testing is considerable.

Moreover, each test of a complete unit requires considerable time so that the test laboratory is often pressed to make as many tests as are demanded for reliable production.

Further than this, the full-scale test equipment is so large that it takes up an inordinate amount of space and is so expensive to acquire and operate that it imposes an objectionable overhead burden on production costs.

Accordingly, it is one of the specific objects of the present invention to provide reliable non-destructive test equipment and method for testing friction materials on brake shoes taken out of the production line and suitable for return to the production line without any impairment of useful life in case the material passes the test successfully. Of course, lining material which is not secured to brake shoes can be tested.

Another object is to provide testing apparatus which is small in size so as to be inexpensive to procure and operate and which will require but little space in the laboratory.

Another object is to provide test apparatus and method which will furnish immediate information during the test on all desired aspects of brake lining quality as fully and completely as could have been provided by full-scale tests. That is, the coefficient of friction, the stability of friction at various temperatures (fade resistance), wear durability, and the like are determined for each specimen.

Another object is to provide test apparatus and method which will greatly reduce the time for making a test, for example, in the range of three or four hours reduced to four or five minutes.

The above and other objects of the invention, as well as various novel features and advantages, will be apparent from the following description of an exemplary embodiment, reference being made to the accompanying drawings, wherein:

FIG. 1 is a vertical elevation and section, diagrammatic in nature, showing one embodiment of test apparatus;

FIG. 2 is an end view taken on the line 2—2 of FIG. 3, showing the test tool or probe used;

FIG. 3 is a vertical section taken on the line 3—3 of FIG. 2;

FIG. 4 is a partial elevation, similar to the upper portion of FIG. 1, showing a drum brake lining segment substituted for the disk brake lining pad for testing.

In general, the apparatus comprises a high speed rotary probe of small size which engages the lining material while it is supported on a holder which has axial movement relative to the turning axis of the probe to exert the desired thrust for testing. The probe may be about 3/8" outside diameter (comparable to the size of rivet heads used to secure brake linings to supporting brake shoes) with the center removed, say by a 1/8" center hole, to provide an annulus, all portions of which travel relative to the surface of the brake lining material to provide rubbing friction, avoiding a dead center zone. The speed is kept constant by using a motor of excess power and controlled speed; and the pressure is controlled, preferably to maintain a constant work rate, meaning a constant torque at the friction interfaces. Means are provided for maintaining the thrust at the constant torque range and for periodically applying and relieving the thrust to provide time-controlled intermittent work applications which simulate brake use on automobiles. Means are provided for registering the temperature created by the friction-caused heat; for measuring the torque produced by the frictional action; for measuring the thrust load imposed between the specimen and the probe; for measuring very precisely the depth of penetration of the probe into the specimen; and for making such other measurements as may be needed to determine the characteristics of the specimen.

The organization, as a whole, may be based on a structure similar to a conventional lathe or boring mill, if horizontal; or a drill press, if vertical; the latter arrangement being illustrated herein but omitting the non-pertinent portions of the assembly.

The parts shown comprise a fixed base 10 adapted to be secured to the main base of the test machine frame, a superposed base 11 carrying a power ram device 12, a vertically movable superstructure 13 carrying at its top a test specimen unit W, and a rotary spindle carrying a chuck 14 adapted to hold the shank 15 of a rotary probe 16. The rotary spindle and motor drive unit (not shown) are pre-positioned and locked to the test machine upright frame in a position depending on the working height of the surface of the material to be tested.

FIG. 1 illustrates a condition in which a flat brake shoe W1 carries a test specimen in the form of a friction pad W2 to be tested.

FIG. 4 illustrates a condition in which a curved drum brake shoe W1' carries a friction lining segment W2' to be tested by a probe 16' with a shank 15'.

Means (not shown) are provided for holding the test specimen in position so that the rotary probe contacts the friction material in the exact same spot each time a test application is made.

The power device 12 may be a wheel cylinder normally used in drum brakes of an automobile and may be supplied with pressure liquid by way of a flexible hose line 20 from a master cylinder 21 which is powered by a prime power device 22 provided with a suitable control device 23 for timing the cycles and controlling the pressure or thrust applied. Normally it is desired to apply the pressure in a manner which will maintain constant the rate of work, which means that the torque is kept constant. An indication of the torque can be fed back by a control line 24 from the torque-measuring device, to be described presently, to control the pressure or thrust produced by the prime power device 22.

If desired, manual pressure applying means may be substituted for the prime power device 22; for example, a lever to operate the master cylinder 21 in a manner similar to that in which non-power automobile foot brakes are operated.

The vertically movable superstructure 13 is provided with guide rings 25 which slide on headed guide pins 26 secured to the base 11, springs 27 being provided on the pins 26 to urge the superstructure to a lower position. The usual brake wheel cylinder, as is well known, has two active pistons but here only one is needed, so the cylinder 12 is carried by a bracket 28 on the frame 11 and the lower piston 12.2 simply occupies a lower position in the cylinder where it reacts against a plate 11.1 comprising part of the frame. The active upper piston 12.3 acts through a thrust rod 29 against the top plate 13.1 of the superstructure 13. The rod 29 has spherical ends fitting in spherical sockets to provide non-binding action. The guide rings 25 of the superstructure extend inward, as at 25.1, so as to rest on the frame when no pressure is being applied.

Means are provided for measuring applied axial force or thrust (input) and the frictional torque (output), the means here shown comprising a unit 30 available on the market as a Lebow Thrust-Torque Sensor. This comprises two relatively movable upper and lower parts connected by suitably shaped parts, some or all of which carry strain gages which indicate thrust and torque by the amount of bending of the flexible members. It is not necessary to show the internal structure of this thrust-torque load cell, it being sufficient to note that the lower part is secured to the superstructure plate 13.1 and that the upper part provides the support for the test specimen W. A cable for the input current and the output signal of the thrust-torque sensor is designated as 30.1. It is shown to extend to thrust-torque indicating meter and recording device 30.2 which is capable of making a chart of both the input thrust and the output torque and also supplying the torque-controlling signals to the pressure or thrust control device 23 by way of the cable 24, as previously explained.

Means are provided for measuring the relative vertical movement between the fixed frame 11 and the vertically movable superstructure 13, this relative movement, at any certain thrust, corresponding to the penetration of the probe into the lining material. As here shown, this relative vertical movement is measured with extreme accuracy by a suitable transducer, such as a micrometer type transformer 35, known generally as a L.V.D.T., comprising a coil portion 35.1 held by a bracket 36 secured to the fixed base and a plunger portion 35.2 carried by a bracket 37 secured to the movable superstructure plate 13.1. The input current and the output signal transmitting leads of the transducer 35 are indicated by the cable 35.3. A meter and chart making device 35.4 may be provided, if desired, to both indicate and record this movement. The meter and recorder are usually separate units but are shown here as one unit for simplicity.

As shown in FIGS. 2 and 3, the probe 16 comprises an annular metal disk 16.1 of small size, as stated, preferably being about 3/8" O.D. and 1/8" I.D. This probe disk is arranged to rotate at a very high speed, up to about twenty thousand r.p.m., and preferably is formed of a material, such as cast iron or steel, commonly used for braking members. Considerable heat is generated in the tests and it is desired to conduct this heat from the probe disk into a heat sink and to provide means for accurately measuring the temperature of the probe, or more specifically, the changes in temperature as developed in successive cycles. To provide for this, the probe disk is secured in good mechanical and heat conductive relationship to a relatively heavy heat sink member 16.2, as of copper, carried by the shank 15.

Means are provided for measuring the relative temperature of the heat sink member 16.2 and for transmitting a signal of the temperature to recording and indicating equipment. It is common to use thermocouples with slip rings for offtake leads for such purposes; but there is a very accurate and reliable instrument available, known as an Infra-red Heat Sensor, and such an indicator 40 is shown here, its input current and output signal being transmitted by leads in a cable 40.1. It is only necessary to mount this instrument near and aim it as the article whose temperature is to be measured, as indicated by the broken line here, and no embedded thermocouples or slip rings are needed. A recorder and chart-making device 40.2 is shown to be provided.

In use, a brake shoe W is clamped on top of the torque-thrust measuring device; the probe and drive unit is positioned and locked to provide a prescribed clearance between the probe and lining; and pressure is applied in the cylinder 12 to bring the lining up against the axially fixed probe disk 16.1, which is rotating at this time. The testing pressure is applied in the amount and for the time desired in one or a plurality of cycles and readings or records taken of thrust, torque, temperature, and penetration.

The thrust may be in the order of 100 pounds, comparable to the actual service loading of 1000 p.s.i. unit lining pressure, and the output torque may be in the range of 100 inch-ounces. In a typical test there might be two cycles of 10 seconds at 50 lbs. thrust with 5 seconds release; followed by 5 cycles of 10 seconds at 50 pounds with 5 seconds release; and this followed by five cycles of 10 seconds at 100 lbs. thrust with 5 seconds release after each application.

Usually the probe is operated on a non-test run to bring the heat sink up to a minimum operating temperature, this particularly being needed when studying fade characteristics.

By keeping the speed and torque constant, with thrust force controlled by torque output, there will be a uniform amount of work output developed as friction at the interfaces of the probe and lining, and the performance can readily be analyzed.

The test hereby provided makes only a slight depression in the lining, a few thousandths of an inch at most, and since the depression is of small diameter the test is non-destructive, hence the brake shoes with linings which successfully withstand the test can be returned to the production line for sale and use.

All of the instruments required for indicating test performance are standard items readily available on the market, which permits a test assembly to be quickly set up at low cost.

Since the coefficient of friction between two relatively sliding surfaces is the ratio of the tangential moving force divided by the contact force between surfaces; and since fade is the lowering of the coefficient of friction relative to temperature; it will be seen that the information provided by the present apparatus and method permits a ready determination of these important factors of brake lining characteristics. Fade is actually a reduction in the coefficient of friction at higher temperatures. In brakes it is highly desirable that the braking pressure and tangential force or torque produced should remain as nearly constant as possible. If fade occurs and the applied pressure greatly increases relative to the braking torque derived, a very dangerous condition is created which needs to be known in advance and avoided if possible. By the present apparatus and method of holding the torque approximately constant and by varying the pressure in response to torque, it will be seen that changes in applied pressure give a direct indication of the fade characteristics of the lining. And since the temperature readings are also provided, there is at once available all the information needed for a dependable study of the pertinent characteristics of the brake lining for any particular application of the brakes. The very precise indication provided by the penetration measuring means, here the micro-transformer, furnishes an immediate indication of the wear characteristics or durability of the brake lining.

Since the tests can be made so very quickly as compared with present methods of testing, it is possible to make all tests necessary to keep pace with rapid production; and since the test is completely non-destructive in its nature, the units treated are completely unharmed and there is no loss of production items.

It is thus seen that the present invention provides apparatus and method of testing friction materials in a very rapid, inexpensive, and dependable manner and without any loss of products.

While one embodiment of the invention has been described for purposes of illustration, it is to be understood that there may be various embodiments and modifications within the general scope of the invention.

I claim:

1. Friction material testing apparatus, comprising in combination, a fixed support, a movable support carried on said fixed support, power pressure means for moving said movable support relative to said fixed support, test specimen supporting means for mounting a brake shoe with lining material thereon upon said movable support for movement between a retracted position and an engaged position, a torque measuring device interposed between said test specimen supporting means and said movable support, a rotary friction probe mounted for rotation adjacent the brake shoe lining material in the retracted position and in contact therewith in the engaged position, and means for measuring the thrust force between said probe and lining while said probe is rotating under thrust pressure against said lining.

2. Friction material testing apparatus, comprising in combination, a rotary probe of small diameter of the same relative size as rivets normally used to secure brake lining material to a brake shoe, means for mounting a brake lining material as a test specimen in a position to be engaged by said rotary probe, and means for producing relative axial movement between said probe and said test specimen to exert thrust force therebetween, said probe comprising a flat-faced annular disk member of a metal commonly used for brake reaction members, said annular disk member being mounted in a supporting and backing heat sink member of large mass relative to the mass of said annular disk member.

3. Friction material testing apparatus, comprising in combination, a rotary disk test probe of such small diameter that such identation as it may make in a brake lining will be immaterial in actual installed operation of brakes, said probe being mounted on a heat sink member with good mechanical and thermal engagement therebetween, means for registering the temperature of said heat sink member, means for mounting a brake shoe with brake lining material thereon as a test specimen in active co-operational position relative to said probe, power pressure means for producing relative axial thrust movement between said test specimen and said probe to bring them into frictional working engagement, means for registering the thrust force between the probe and test specimen, means for registering the torque produced between the probe and test specimen, and means for precisely registering the relative axial movement between said probe and said test specimen.

4. Apparatus as set forth in claim 3, further characterized by the fact that said means for registering temperature comprises an infra-red temperature responsive device disposed near said heat sink member, said probe and its heat sink member occupying a relatively fixed axial position during test action.

5. Friction material testing apparatus, comprising in combination, a high speed rotary test probe disk of small diameter mounted on the end of a large heat sink member of high heat conductivity for rotation about a fixed axis of rotation, a fixed support located in a line along the axis of rotation, said probe being journaled in a fixed position relative to said fixed support, a movable support mounted in axial guides on said fixed support, resilient means normally urging said movable support toward said fixed support, hydraulic ram means for urging said movable support away from said fixed support, a torque-thrust box mounted on said movable support, a test specimen support carried by said torque-thrust box for holding brake lining material as a test specimen adjacent said rotary probe, means for registering the torque and thrust from said torque-thrust box, means for registering the temperature of said heat sink member during a test, means for registering the relative axial movement between said probe and test specimen during a test, means for controlling the thrust force exerted by said ram means during a test, means for interacting between said torque-thrust measuring means and said thrust force controlling means for controlling the thrust force in accordance with the torque produced.

6. Friction material testing apparatus as set forth in claim 5, further characterized by the fact that said temperature registering means comprises a spatially separated non-contacting temperature responsive device mounted near said heat sink member.

7. Friction material testing apparatus, comprising in combination, a flat-faced rotatable metal disk, a heat sink body of high thermal capacity and conductivity and relatively great mass mechanically and thermally bonded to said disk, and means carried by said heat sink body for mounting it in a rotary carrier head.

8. Friction material testing apparatus as set forth in claim 7, in which said disk is of a material like that used for braking surfaces, said disk having an annular shape with an outside diameter of less than one half of an inch and an inside diameter greater than one eighth of an inch, whereby to make tests without deterioration of the lined shoe for production use, the I.D. of the disk being in the range of about ⅛″ to assure that all portions of the disk have surface travel relative to the brake lining material being tested.

9. The method of testing friction materials, which comprises, mounting a brake lining test specimen in a position accessible to a rotary test probe, engaging the test specimen by a rotary test probe of such small diameter that any impression made thereby will not impair the subsequent usefulness of the brake lining material for service, bringing thrust pressure between the probe and test specimen to force them together, rotating the probe at high speed against the test specimen, and registering the thrust force, the relative axial movement, the torque, and the temperature generated at the test probe during a test, said thrust force being controlled in response to the torque during a test.

10. The method as set forth in claim 9, further characterized by the fact that the thrust force is controlled in such manner as to maintain substantially constant torque during a test.

11. The method as set forth in claim 9, further characterized by the fact that thrust force is applied in intermittent short periods of time separated by short periods of separation, with increase of thrust force during later periods of a test.

References Cited

UNITED STATES PATENTS

| | | | |
|---|---|---|---|
| Re. 24,472 | 5/1958 | Farmer | 73—9 |
| 2,018,688 | 10/1935 | Tilden | 73—9 |
| 2,266,305 | 12/1941 | Boegehold et al. | 73—9 X |
| 2,441,993 | 5/1948 | Dasher | 73—7 |

LOUIS R. PRINCE, *Primary Examiner.*

J. NOLTON, *Assistant Examiner.*